July 30, 1940.    G. W. ASHLOCK, JR    2,209,305
FRUIT PITTER
Original Filed Jan. 8, 1938
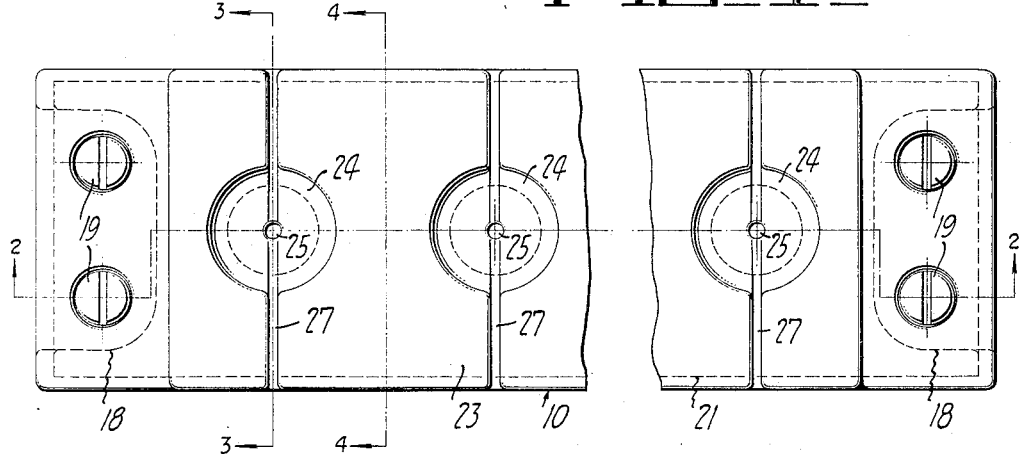
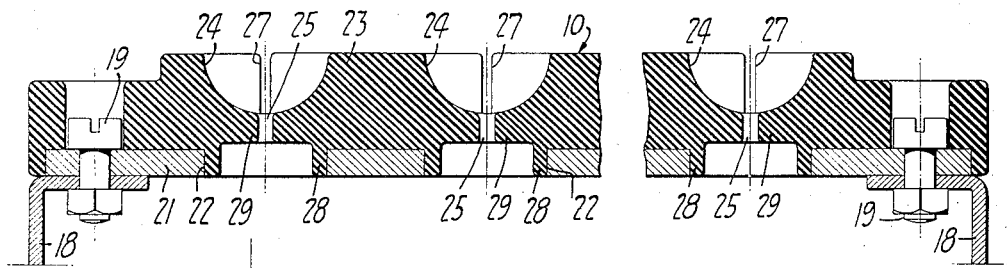
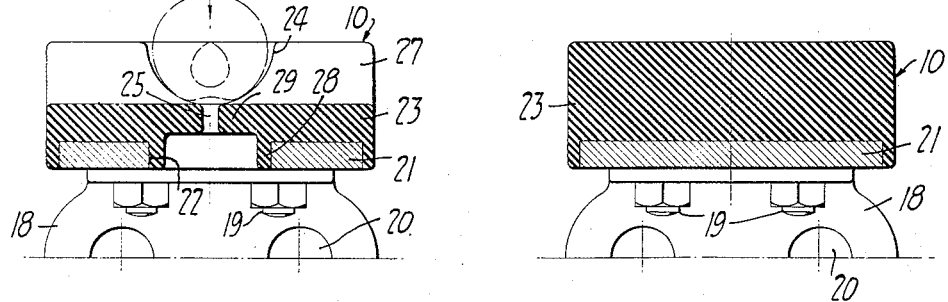
INVENTOR
George W. Ashlock Jr.
BY Robert N. Eckhoff
ATTORNEY Patented July 30, 1940

2,209,305

UNITED STATES PATENT OFFICE 2,209,305

FRUIT PITTER

George W. Ashlock, Jr., Oakland, Calif.

Original application January 8, 1938, Serial No. 184,007, now Patent No. 2,157,518, dated May 9, 1939. Divided and this application March 10, 1939, Serial No. 260,968

5 Claims. (Cl. 146—19)

This invention relates to a fruit pitting mechanism, and particularly to a mechanism for stoning cherries. The present application is a division of my application Serial Number 184,007 filed January 8, 1938, now Patent Number 2,157,-518 of May 9, 1939.

The present invention will be particularly described as applied to the stoning of cherries. However, it will be obvious to one skilled in the art that my invention can be used advantageously with other fruits, for example, apricots and olives.

In cherry stoning machines of the character with which we are herein concerned it is desirable that the cherry be held accurately in position during entrance of the knife, during cutting and ejection of the pit, and during removal of the knife so that the cherry is cut to a minimum. Now while the stoning of cherries is an old art, it has been heretofore characterized by relatively slow speed operations, cherries having even been stoned by hand. The present invention is concerned with provision of a cherry carrier or receptacle structure of such a nature that the cherry is held firmly and accurately by a relatively simple, rugged, and yet inexpensive device to the end that cherries can be stoned rapidly, accurately, and with minimum cutting and alteration in the appearance of the cherry.

It is in general the broad object of the present invention to provide an improved and novel fruit carrier of the character heretofore described.

As a result of an extended investigation of various structures, I found that it was possible to hold a cherry in position while it was stoned so that the knife merely cut the cherry and ejected the pit and did not turn the cherry. The structure provided to attain this includes a rigid base plate faced with a heavy facing of a resilient material; the resilient material is so mounted on the base plate as to provide support for the fruit undergoing pitting and, at the same time, to permit ready, positive removal of the stone.

The invention includes additional objects and features of advantage, some of which, together with the foregoing, will appear hereinafter wherein the present preferred embodiment of the invention is disclosed. It will be understood that the form of the mechanism disclosed is only that presently preferred and that within the scope of the appended claims various other embodiments may be adopted.

In the drawing accompanying and forming a part hereof Figure 1 is a plan view of the fruit carrier of the present invention.

Figure 2 is a section taken along the line 2—2 of Figure 1, while Figures 3 and 4 are sections taken respectively along the lines 3—3 and 4—4 in Figure 1.

The fruit carrier of the present invention comprises a structure generally indicated at 10 and adapted to be mounted between opposite conveyor chains (not shown) after the manner disclosed in my aforementioned patent. The conveyor chains are moved to convey fruit, for example, to the fruit pitting mechanism as is disclosed in my said patent. Each carrier is made up of a flat metal plate or a base plate of relatively rigid material, this plate being indicated at 21. Angles 18 are attached by bolts 19 at each end of the plate so that each plate 21 can be positioned between the opposite conveyor chains, the angles carrying apertures 20 to facilitate the attachment to the chains.

The plate 21 is apertured as at 22 and usually a plurality of these apertures are provided centrally across the plate. The apertures are preferably circular in cross section, but their form can be varied so long as it does not interfere with the functioning of the cherry stoning mechanism or the stone ejection.

The base plate 21 acts as a carrier plate in conjunction with a surface facing or coating of the resilient material 23 such as rubber, "duprene," "neoprene," "thiokol," or the like. This resilient material is preferably integrally bonded to the face of the metal according to methods well known in the art. It is highly desirable that the junction between the resilient material and the metal be substantially an integral one, or else what amounts functionally to an integral bonding if the resilient material is to act suitably and position and retain the cherries accurately during the subsequent stoning operation. This bonding or integral is not to be compared with the mere positioning of a rubber cup or insert into an aperture in the metal plate which is shown in some prior art patents such as the Glaser British Patent 16,374 of 1907, because in this type of structure suitable support will not be provided for the rubber and the cherry will not be maintained accurately in position during the stoning operation.

The rubber resilient facing sheet 23 is flat on its upper face so that when a plurality of the carrier structures 10 are assembled close together on the conveyor chain they form a flat continuous work surface when the chains are run substantially horizontally. The only depression formed in the surface of the carrier is that provided by the cup-like receptacles 24, which receive the fruit as in Figure 3, wherein knife 26 is shown as descending to eject the pit in the cherry. Each receptacle has the aperture or passage 25 therein through which the cherry stone passes for ejection.

Each receptacle is slotted as at 27 and the adjacent portion of the resilient member 23 is also slotted. This slot has two advantages. First of all it has a mechanical advantage in permitting the use of knives or saws so that, subsequent to the pitting operation, the fruit can be cut in half. It also permits the resilient member to flex suitably whereby, during the stoning operation, the rubber flexes inwardly slightly and retains the fruit accurately in position so that the fruit does not turn. This function in the resilient facing is also present independently of the slots 27 because of the projective resilient portion 29 adjacent passage 25 which flexes and permits the side walls of the entire receptacle to engage the fruit surface as the knife enters and engages the stone.

It is also to be noted that the resilient member is bonded to the plate 21 adjacent to the area of each aperture 22, this bonding being particularly indicated by numeral 28. This provides a suitable support for the extending portion 29 which forms the bottom of the receptacle and surrounds the passage 25.

I am aware that it has heretofore been proposed to provide rubber belts having receptacles for fruit, but these I have found unsuitable for high speed, rapid stoning operations because they did not permit positioning of the fruit in an accurate manner, nor accurate retention of the fruit. Further, they were subject to a high rate of wear. Rubber inserts in metal plates I have previously discussed. It has also been proposed to mount the rubber cups between metal plates, but this has proven unsatisfactory because, for example, the structure could not be adequately cleaned, and, at the same time, adequate support for the rubber cups could not be provided to permit of rapid and repeated flexing to retain the fruit. In one such commercial device, employing separate rubber cups, the life of the cups is about one week. The structure of this invention has a life, under the same conditions, of from eight to ten weeks.

It is to be noted that while the rubber receptacle herein flexes slightly to grip a positioned cherry and hold it in position, a typical commercial device employing rubber cups is subject to the objection that its receptacles flex so much that the pit is squeezed from the cherry and the side walls split. The receptacle 24 must grip but not squeeze and compress the fruit.

It is also to be noted that each aperture 22 and the rubber banding 28 provide a passage of less diameter than the cherry. This ensures rigidity to the end that the knife 26 does not merely depress the fruit in the cup without pitting it. One commercial device is subject to this failure; it is a serious one since it permits unpitted cherries to pass. The receptacles can be made in various sizes to suit various size cherries.

I am aware of U. S. Patent 2,092,956 of September 14, 1937.

I claim:

1. In a fruit stoning device of the character described, a fruit holder comprising a substantially flat rigid base plate having a plurality of spaced apertures therein of generally circular cross-section, and a substantially flat rubber sheet substantially integrally bonded to a face of said rigid base plate and having tubular portions projecting into the said apertures and being bonded to the walls of said apertures, said rubber sheet having a plurality of cup like receptacles formed in the outer face thereof, each receptacle being substantially aligned vertically over one of said apertures, each receptacle being apertured adjacent the bottom thereof to pass a fruit stone ejected from fruit in the receptacle.

2. In a fruit stoning device of the character described, a fruit holder comprising a substantially flat rigid base plate having a plurality of spaced apertures therein of generally circular cross-section, and a substantially flat rubber sheet substantially integrally bonded to a face of said rigid base plate and to those portions of said plate providing said apertures, said rubber sheet having a plurality of cup like receptacles formed in the outer face thereof, each receptacle being substantially aligned vertically over one of said apertures, each receptacle being apertured adjacent the bottom thereof to pass a fruit stone ejected from fruit in the receptacle, said rubber sheet having a slot cut in the outer face of said sheet and transversely to the longitudinal axis of said sheet, each cut extending centrally through one of said receptacles and to only about the bottom of said one receptacle.

3. In a fruit stoning device of the character described, a fruit holder comprising a substantially flat rigid base plate having an aperture therein of generally circular cross-section, and a substantially flat rubber sheet substantially integrally bonded to a face of said rigid base plate and having a tubular portion projecting into the said aperture and being bonded to the walls of said aperture, said rubber sheet having a cup like receptacle formed in the outer face thereof, said receptacle being substantially aligned vertically over said aperture, said receptacle being apertured adjacent the bottom thereof to pass a fruit stone ejected from fruit in the receptacle.

4. In a fruit stoning device of the character described, a fruit holder comprising a substantially flat rigid base plate having a plurality of spaced apertures therein of generally circular cross-section and a substantially flat rubber sheet substantially integrally bonded to a face of said rigid base plate, said rubber sheet having flanges at its outer sides covering the sides of said base plate and integrally bonded thereto, said rubber sheet also having a plurality of cup like receptacles formed in the outer face thereof, each receptacle being substantially aligned vertically over one of said apertures, each receptacle being apertured adjacent the bottom thereof to pass a fruit stone ejected from fruit in the receptacle.

5. In a fruit stoning device of the character described a fruit holder comprising a substantially flat rigid base plate having a plurality of spaced apertures therein of generally circular cross-section and a substantially flat rubber sheet substantially integrally bonded to a face of said rigid base plate, said rubber sheet having flanges at its outer sides covering the longitudinal sides of said base plate and integrally bonded thereto, said rubber sheet also having a plurality of cup like receptacles formed in the outer face thereof, each receptacle being substantially aligned vertically over one of said apertures, each receptacle being apertured adjacent the bottom thereof to pass a fruit stone ejected from fruit in the receptacle.

GEORGE W. ASHLOCK, Jr.